United States Patent
Ostuni et al.

(10) Patent No.: US 11,040,877 B2
(45) Date of Patent: Jun. 22, 2021

(54) PROCESS FOR MAKING A SYNTHESIS GAS BY REFORMING OF A HYDROCARBON AND INCLUDING RECOVERY OF CARBON DIOXIDE AT HIGH TEMPERATURE

(71) Applicant: Casale SA, Lugano (CH)

(72) Inventors: Raffaele Ostuni, Lugano (CH); Giada Franceschin, Como (IT)

(73) Assignee: Casale SA, Lugano (CH)

( * ) Notice: Subject to any disclaimer, the term of this patent is extended or adjusted under 35 U.S.C. 154(b) by 42 days.

(21) Appl. No.: 15/765,917

(22) PCT Filed: Aug. 17, 2016

(86) PCT No.: PCT/EP2016/069481
§ 371 (c)(1),
(2) Date: Apr. 4, 2018

(87) PCT Pub. No.: WO2017/063777
PCT Pub. Date: Apr. 20, 2017

(65) Prior Publication Data
US 2018/0305207 A1 Oct. 25, 2018

(30) Foreign Application Priority Data
Oct. 15, 2015 (EP) .................................... 15189905

(51) Int. Cl.
*C01B 3/48* (2006.01)
*B01D 53/14* (2006.01)
*C01B 3/52* (2006.01)

(52) U.S. Cl.
CPC ............ *C01B 3/48* (2013.01); *B01D 53/1425* (2013.01); *B01D 53/1475* (2013.01); *C01B 3/52* (2013.01);
(Continued)

(58) Field of Classification Search
CPC .... C01B 3/48; B01D 53/1425; B01D 53/1475
See application file for complete search history.

(56) References Cited

U.S. PATENT DOCUMENTS 4,981,669 A * 1/1991 Pinto ........................ C01B 3/025
  252/376
5,093,102 A * 3/1992 Durand .................. B01D 53/04
  423/437.1
(Continued)

FOREIGN PATENT DOCUMENTS

AU 728 167 B2 1/2001
EP 2 065 337 A1 6/2009
(Continued)

OTHER PUBLICATIONS

International Search Report dated Oct. 31, 2016 in connection with PCT/EP2016/069481.
(Continued)

*Primary Examiner* — Paul A Wartalowicz
(74) *Attorney, Agent, or Firm* — Akerman LLP

(57) ABSTRACT

Process for making a hydrogen-containing synthesis gas (105) from a hydrocarbon feedstock (101), comprising the reforming of said hydrocarbon feedstock and purification of raw synthesis gas, said purification comprising shift conversion of carbon monoxide into carbon dioxide and subsequent absorption of carbon dioxide into an absorbing medium (7a, 14), resulting in a stream of a CO2-rich medium (5), and regeneration of said medium with recovery of CO2 absorbed therein, wherein said raw synthesis gas (102) is produced by the reforming step at a pressure of at least 45 bar, said regeneration of the CO2-loaded medium includes a step of chemical regeneration and the CO2-loaded medium has a temperature of at least 150° C. during said chemical regeneration.

15 Claims, 3 Drawing Sheets

(52) U.S. Cl.
CPC .......... *B01D 2252/204* (2013.01); *C01B 2203/0244* (2013.01); *C01B 2203/0283* (2013.01); *C01B 2203/047* (2013.01); *C01B 2203/0415* (2013.01); *C01B 2203/0475* (2013.01); *C01B 2203/068* (2013.01); *Y02C 20/40* (2020.08); *Y02P 20/151* (2015.11)

(56) References Cited

U.S. PATENT DOCUMENTS

2009/0169931 A1* 7/2009 Qi .................. H01M 8/04097
  429/409
2011/0318251 A1* 12/2011 Allam ................ C01B 3/025
  423/359

FOREIGN PATENT DOCUMENTS

| JP | H1067994 A | 3/1998 |
|----|------------|--------|
| WO | 2009/112518 A1 | 9/2009 |

OTHER PUBLICATIONS

Max Appl: "Ammonia, 3. Production Plants", In: "Ullmann's Encyclopedia of Industrial Chemistry", Oct. 15, 2011, Wiley-VCH Verlag GmbH & Co. KGaA, Weinheim, Germany.

\* cited by examiner

PROCESS FOR MAKING A SYNTHESIS GAS BY REFORMING OF A HYDROCARBON AND INCLUDING RECOVERY OF CARBON DIOXIDE AT HIGH TEMPERATURE

This application is a national phase of PCT/EP2016/069481, filed Aug. 17, 2016, and claims priority to EP 15189905.1, filed Oct. 15, 2015, the entire contents of both of which are hereby incorporated by reference.

FIELD OF THE INVENTION

The present invention relates to the field of production of a hydrogen containing synthesis gas by reforming of a hydrocarbon. More in detail, the invention relates to the recovery of carbon dioxide during purification of said synthesis gas.

PRIOR ART

The reforming of hydrocarbons for production of a hydrogen containing synthesis gas is known in the art, for example to produce a synthesis gas (make-up gas) for industrial production of ammonia.

The production process usually comprises a reforming step which produces a raw syngas followed by a purification step. The reforming step may include steam reforming in a primary reformer and subsequent secondary reformer with air, enriched air or pure oxygen, or autothermal reforming. The raw syngas is conventionally produced at a pressure of around 15 to 30 bar. The purification step typically includes shift conversion of carbon monoxide into carbon dioxide, removal of carbon dioxide and optionally methanation.

The removal of carbon dioxide from the raw syngas is generally required by the use of the syngas, e.g. to avoid poisoning the catalyst in the ammonia production. In some cases the so obtained carbon dioxide is a valuable product, for example as a raw material for another industrial process. In an integrated ammonia/urea plant, for example, the hydrogen-containing synthesis gas is used to produce ammonia and the recovered $CO_2$ is used together with the ammonia for the synthesis of urea.

The common prior art technique to remove carbon dioxide from the shifted synthesis gas is the absorption of carbon dioxide in a suitable absorbing medium, e.g. an aqueous solution of an alkanolamine.

The absorption produces a $CO_2$-loaded solution which is regenerated with a physical and/or chemical regeneration process. The term regeneration process denotes a process which removes the carbon dioxide form the solution and produces a $CO_2$ stream and a lean solution which is sent again to the absorption process. Typically, physical regeneration is obtained by flashing the solution to a low pressure, while chemical regeneration is obtained by furnishing heat to the solution. In some cases regeneration includes a flashing step followed by a stripping step. The two steps could either occur in separate columns, or in segregated portions of the same column. The heat input is usually recovered from the CO-shifted synthesis gas, particularly from the low-temperature shift converter effluent. For example, the syngas leaving the shift converter is the heat source of a bottom reboiler of a stripping column.

According to the prior art the removal of carbon dioxide from the $CO_2$ loaded solution by a chemical process, for example the above mentioned step of stripping, is carried out at a low temperature of about 130° C. and at a low pressure of no more than 2 bar.

The low temperature is dictated by the common use of the shift effluent as heat source. The syngas leaving the shift process, for a conventional reforming pressure of 30 bar, typically has a dew point around 165° C. As most of the heat is transferred during condensation of the water content of the syngas, the temperature of regeneration must be sufficiently lower than temperature of the dew point, leading to the above mentioned temperature of about 130° C.

The low pressure, on the other hand, is due to the fact that the chemical regeneration is usually preceded by a physical regeneration by flashing the $CO_2$-loaded solution, and the prior art consistently teaches to flash the solution to the lowest possible pressure, in order to reduce the heat input.

More in detail, the flashing step (expansion of the solution) usually provides the recovery of the pressure energy by an expander such as a hydraulic turbine, and the recovered mechanical energy is typically used for the solution circulation pumps, e.g. by direct coupling of the turbine with the pump. Hence the $CO_2$ recovery by flashing requires practically no energy input, while the $CO_2$ recovery by stripping requires a significant energy input in the form of heat transferred to the stripping column.

For this reason the prior art promotes the recovery of as much $CO_2$ as possible by flashing, using the full available pressure drop, in order to reduce the consumption of thermal energy and to maximize the power recovery in the turbine.

The pressure drop available to flashing substantially corresponds to the difference between the pressure of absorption of $CO_2$ from the syngas and the pressure of the subsequent stripping process. The pressure of absorption of $CO_2$, in turn, is substantially the same as the pressure of the produced syngas (apart from the pressure drops), i.e. generally around 15 to 30 bar.

With a raw syngas produced at about 30 bar, the pressure drop of flashing is generally around 28 bar or more. This saves energy but, on the other hand, exports $CO_2$ at a low pressure, usually less than 2 bar.

A low pressure of the exported $CO_2$ is a disadvantage if a subsequent industrial use requires $CO_2$ under a high pressure, which is the case, for example, of the synthesis of urea. Raising the $CO_2$ to the pressure of use is expensive both in terms of capital cost, due to the need of a higher number of stages of compression, and in terms of energy required. In some cases it may also be desirable to compress the $CO_2$ for the purpose of sequestration.

Hence there would be an incentive to recover carbon dioxide at a higher pressure. Recovery of carbon dioxide at high pressure, however, has been discouraged so far due to poor efficiency from an energetic point of view.

A higher pressure of recovered $CO_2$ would reduce the pressure drop available to the flashing stage, shifting the recovery of a larger amount of $CO_2$ to the stripping stage which, as explained above, consumes thermal energy. Moreover, it would reduce the amount of mechanical energy recovered by expansion of the solution in the hydraulic turbine. In addition, carrying out the stripping process at a higher pressure would significantly reduce the amount of heat recoverable from the syngas effluent of the shift converter which, as explained above, in most cases is the main heat source of the stripping process.

More in detail, the heat which promotes the stripping is transferred to the saturated liquid contained in the bottom of the column (bottom liquid) whose temperature is a function of the pressure of stripping (due to saturated condition). Consequently, a higher pressure of stripping results in a higher temperature of said liquid which leaves only a smaller difference of temperature (delta-T) for heat exchange with the hot syngas.

As mentioned above, most of the heat transferred from the syngas to the bottom liquid comes from condensation of the water vapour contained in the syngas. Raising the pressure of stripping may raise the column bottom temperature to a value higher than the syngas dew point. As a result, most of the heat recoverable from the syngas becomes available only at a lower temperature than the stripping process, hence it cannot be used for that purpose.

For example the syngas leaving the low temperature CO-shift converter, for a conventional reforming pressure of 30 bar, typically has a dew point around 165° C. The saturated bottom liquid of the stripping column at the conventional low pressure of 1.7 bar has a temperature of 125° C. which means that the syngas can be a suitable heat source and can be cooled under the dew point recovering the latent heat of condensation of water. However, under a pressure of about 5.5 bar the bottom liquid would reach a temperature of 160° C.; taking into account that the heat exchange requires a minimum of 10° C. difference between the hot stream and the cold stream, this means that the syngas could not be cooled under the dew point and the latent heat would be lost or at least de-graded.

Integration of the missing heat from another source is generally not possible or not convenient. For example, an ammonia plant typically comprises a steam network, with three headers operating at three pre-determined pressure levels: a high pressure of about 100 bar, a medium pressure of about 40 bar and a low pressure of about 3-4 bar. The steam is expanded from the high pressure header to the medium and low pressure headers in steam turbines to produce mechanical power. Some of the steam is expanded to sub-atmospheric pressure (0.1-0.2 bar absolute) for mechanical power generation. Much steam is however expanded to 3 to 4 bar, in backpressure steam turbines. The exhaust of the backpressure turbines at pressure of 3-4 bar and corresponding saturation temperature of 133-143° C. could be used as heat source. This pressure however is too low to provide heat to the stripping of the semi-lean solution at temperatures above 133° C. Referring again to the above example, the stripping column would require steam at more than 160° C. corresponding to a pressure of condensation of at least 7 bar and hence, taking into account the pressure drops, a steam source at about 9 or 10 bar would be required. However no steam at this pressure is generally available in the ammonia plants. The low pressure steam system generally works at 3-4 bar and steam at medium of high pressure, if available, is considerably above the stripping pressure, which would make its use to heat the CO2 stripper highly inefficient. Producing steam at about 10 bar specifically for stripping the semi-lean solution would also be inefficient, e.g. steam might be extracted from a steam turbine of the ammonia plant which however would reduce the output of the turbine.

To summarize, an increase of the stripping pressure, in order to export CO2 at a higher pressure and save some of the cost of compression, would dramatically reduce the recoverable heat from the hot syngas, resulting in an overall disadvantage in terms of energy efficiency of the process.

Taking all the above into account, the prior art still follows the approach of CO2 recovery at a low pressure of no more than 2 bar and at a low temperature.

SUMMARY OF THE INVENTION

The aim of the invention is to overcome the aforementioned drawbacks and limitations of the prior art. In particular, the invention aims to increase the energy efficiency of the recovery of carbon dioxide from purification of hydrogen-containing synthesis gas and subsequent compression of the carbon dioxide for a further use, notably for the production of urea in an ammonia-urea plant. More in particular, the invention aims to improve the energy efficiency of carbon dioxide removal by absorption and regeneration of a CO2-loaded solution.

These aims are achieved with a process for making a hydrogen-containing synthesis gas from a hydrocarbon feedstock, according to claim 1. Preferred aspects of the invention are stated in the dependent claims.

The present invention is characterized in that: the reforming step is carried out at a high pressure of at least 45 bar, preferably at least 55 bar; the regeneration of the CO2-loaded medium is carried out predominantly with a chemical regeneration process, and the CO2-loaded medium, during said chemical regeneration process, has a temperature of at least 150° C., preferably at least 160° C. The heat source for regeneration of said CO2-loaded medium comprises at least one of the following: an effluent of a shift converter; a feed stream of a shift converter; a cooling medium which circulates in an isothermal shift converter.

Said shift converter or isothermal shift converter preferably takes part to said process of making a hydrogen-containing synthesis gas. For example the shift converter is part of a purification section after a reforming section.

According to various embodiments, the full amount of the heat input for regeneration of the CO2-loaded medium, or only a portion of said heat input, is taken from one or more of the above mentioned streams, namely effluent or feed stream or cooling medium of a shift converter.

The idea underlying the invention is to combine generation of the syngas at a high pressure in the front-end with a recovery of CO2 made predominantly by a chemical process and at a high temperature of at least 150° C., preferably at least 160° C.

The term of chemical regeneration process denotes a process where CO2 absorbed in the medium is released chemically and where regeneration is effected by a suitable heat input transferred to the medium. In contrast, a physical regeneration process denotes a process where the release of CO2 is substantially a physical process, for example induced by flashing the medium to a lower pressure.

In some embodiments of the invention, the regeneration involves both a physical and a chemical process. Preferably at least 40% of the carbon dioxide separated from the CO2-loaded medium is released chemically by the above mentioned heat-induced chemical process. More preferably the amount of CO2 released chemically is greater than the amount of CO2 released physically (e.g. by flashing the loaded solution). In some embodiments, the total amount of CO2 is released chemically.

A preferred embodiment of the invention is to carry out the reforming process with a high steam-to-carbon ratio, preferably 2.9 or greater and more preferably 3.3 or greater.

The heat input of said chemical regeneration process is preferably recovered cooling a stream with a dew point of 190° C. or higher. Preferably, said heat source for regeneration of the CO2-loaded medium is a heat source stream having a dew point of at least 190° C.

The heat input of said chemical regeneration process is preferably recovered from the shift conversion of the syngas. The heat input can be transferred directly by the feed or more preferably by the effluent of a shift converter or a further heat exchange medium can be used, according to various embodiments. For example, a further heat exchange medium may be steam produced by cooling down a shift converter.

Said shift converter is preferably a low-temperature shift converter or a medium-temperature shift converter. The term low-temperature denotes a shift converter operating in the range 180-250° C.; the term medium-temperature denotes a shift converter operating in the range 180-300° C.

Preferably, said heat input is transferred to the CO2-loaded medium by cooling of a shift converter effluent having a dew point of at least 190° C. Accordingly, the effluent can be a convenient heat source for the CO2-loaded medium under regeneration having a temperature of at least 150° C.

In a preferred embodiment, the process of regeneration involves two stages, namely: a first step of flashing the CO2-loaded solution from an input pressure to a flashing pressure, obtaining a first CO2 stream and a partially regenerated semi-lean solution; a second step of stripping at least part of said semi-lean solution obtaining a second CO2 stream and a fully regenerated (lean) solution. The release of said first CO2 stream is induced by the low pressure and is essentially a physical process; the release of the second CO2 stream, instead, is induced by a heat input and is essentially a chemical process.

In a preferred embodiment, the regeneration of said CO2-loaded solution comprises a step of heat stripping the solution, possibly after a flashing step. In such a case, the above mentioned temperature of at least 150° C. is the temperature of the bottom liquid of a stripping column where said stripping of the solution is carried out. For example the hot effluent of a shift converter and/or steam are used to heat a bottom reboiler of a stripping column where the semi-lean solution is stripped and, consequently, CO2 is separated.

Preferably said heat stripping is carried out at a pressure of at least 3 bar.

The invention provides a combination of: operation of the front-end at a high reforming pressure of at least 45 bar and preferably at least 55 bar; regeneration of the CO2-loaded solution which is carried out predominantly or exclusively by a chemical process and at a high temperature, as the temperature of the solution is at least 150° C. The term of reforming pressure denotes the pressure at the outlet of the secondary reformer or autothermal reformer.

When regeneration includes a flashing stage and a subsequent stripping stage, the reforming pressure higher than conventional, namely 45 bar or more, is used to carry out the stripping process of the semi-lean solution at a higher pressure than the conventional process. The higher pressure of the syngas is used only partially in the flashing step. In other words, the pressure drop of the flashing step is deliberately less than the maximum possible, in order to carry out the subsequent stripping at a higher pressure, which correspondingly increases the pressure of the exported CO2.

When the heat source is the shifted gas, a technical problem is the dew point of said gas. As explained above, most of the heat content of the syngas is transferred below the dew point; if the gas cannot be cooled under the dew point, only a limited amount of the heat content can be recovered by the stripper. This leads to a poor utilization of the hot shifted gas, since the missing heat must be furnished to the stripper with another source and, on the other hand, the unrecovered heat in the syngas has a low value (low temperature and low enthalpy) and, as a general rule, cannot be exploited efficiently.

A remarkable consequence of the greater reforming pressure is a rise of the dew point of the shifted syngas. For example, reforming at 55 bar will produce a syngas with a dew point around 200° C. compared to the 165° C. of the common prior art. Accordingly, the use of said shifted gas as heat source for the stripping of the semi-lean solution is thermodynamically much more efficient and a much larger amount of heat can be transferred to the stripping process. Furthermore, heat is transferred at a higher temperature making the process thermodynamically more efficient.

The increase of the s/c ratio, which is another aspect of the invention, is in contrast with the prior art prompting to low steam-to-carbon ratios, usually 2.7 or less. The applicant has found that a greater s/c ratio is synergistic with the higher reforming pressure since it provides more conversion of the hydrocarbon source in the reforming step, and more shift conversion of CO. In addition, the larger amount of steam (due to the greater s/c ratio) in the shifted syngas has a positive effect on the CO2 recovery since it increases the high-temperature heat available for regeneration of the solution and the gas dew point. Increasing the heat available at high temperature means that also the pressure of regeneration (stripping pressure) can be increased and, hence, the CO2 can be exported at a higher pressure and cost of the subsequent compression is reduced.

Another possible source of heat for the CO2 removal according to the invention is the feed stream of the CO shift converter.

In order to fully appreciate this advantage, it should be noted that the CO2 compression ratio of the prior art can be as high as about 150, requiring several stages as the maximum compression ratio of one stage is around 3. By starting the compression from a higher pressure (delivery pressure of the CO2), the invention eliminates at least one or two low-pressure stages. The low pressure stages are the largest and most expensive and, hence, the saving is considerable. Moreover, the low pressure stages limit the maximum single train capacity of CO2 compressors. Eliminating the low pressure stages has the advantage of greatly increasing the maximum single train capacity of CO2 compressors. CO2 compressors are among the major cost items of an ammonia/urea plant.

According to some embodiments of the invention, a depressurization takes place before or during the stripping of the semi-lean solution. For example, in a preferred embodiment, the CO2-rich solution is flashed to a first pressure of 3 to 5 bar and the so obtained semi-lean solution is then stripped at a lower pressure, for example around 3 to 5 bar.

The absorbing medium is preferably an aqueous solution of a suitable CO2 absorber, more preferably an amine aqueous solution. More preferably, said medium is an aqueous amine solution comprising at least one tertiary aliphatic alkanolamine (e.g. methylaminopropylamine, MAPA) and preferably an activator in the form of a primary or secondary amine (e.g. piperazine, piperidine).

The reforming of the hydrocarbon feedstock may include primary reforming in the presence of steam and secondary reforming with an oxidant, or auto-thermal reforming (ATR). The reformed raw syngas is produced at a pressure of at least 45 bar, preferably 55 bar or higher.

The invention has several benefits from the point of view of the energy efficiency. As mentioned above, more heat can be transferred from the shifted syngas to the stripping column for regeneration of the semi-lean solution, thanks to the higher dew point of the syngas stream. The higher pressure of reforming results in a higher pressure of absorption of the CO2, which means that also the flashing step can be exploited conveniently even though the final expansion pressure is higher than the process of the prior art. Finally, the carbon dioxide is exported at a high pressure which considerably reduces the costs for subsequent compression. An important advantage in this respect is the reduced number of stages and cost of the compressor.

The advantages of the invention will emerge more clearly from the following detailed description of preferred embodiments.

DETAILED DESCRIPTION OF PREFERRED EMBODIMENTS

Figure 1:
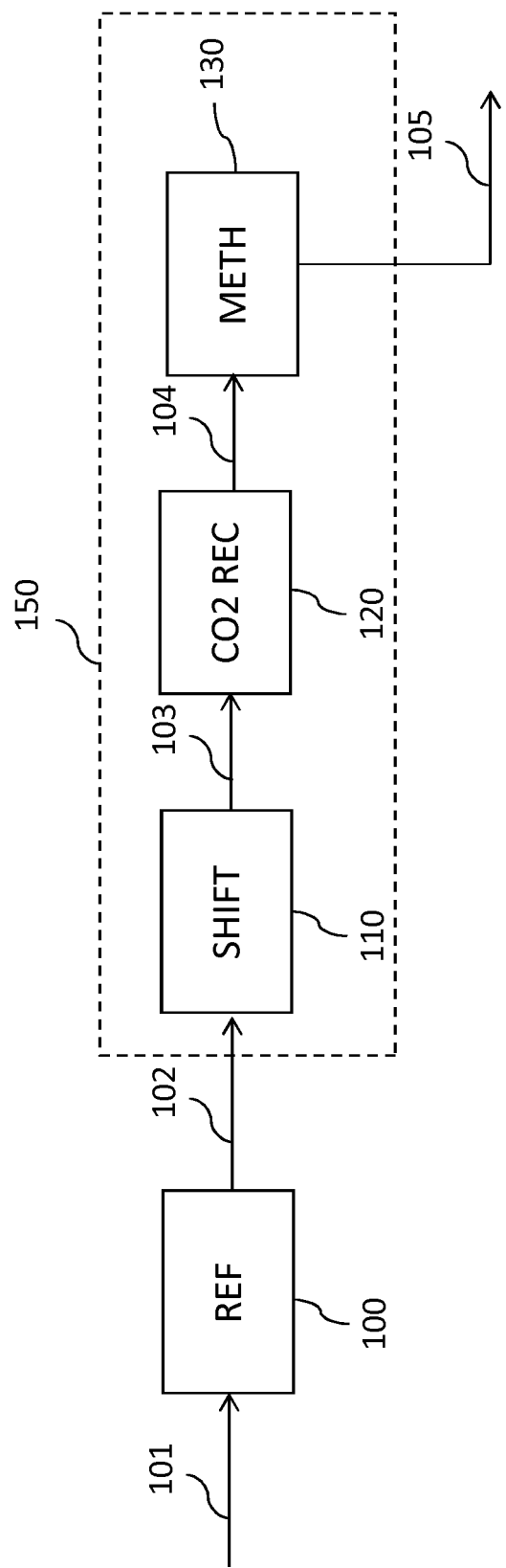
FIG. 1 is a block scheme of reforming a hydrocarbon feedstock and production of a hydrogen-containing synthesis gas.

FIG. 1 illustrates a block scheme of a front-end for making a synthesis gas according to an embodiment of the invention.

Block 100 denotes a reforming section, where a natural gas feedstock 101 is converted into a raw syngas 102, which is purified in a purification section 150 to obtain a product synthesis gas 105.

The purification section 150 comprises a shift section 110 providing a shifted gas 103, a carbon dioxide recovery section 120 providing a CO2-depleted gas 104 and optionally a methanation section 130.

The shift section 110 may comprise one or more shift converters, for example a high-temperature or medium-temperature converter followed by a low-temperature converter.

The front-end usually comprises a number of heat exchangers, e.g. to remove heat form the hot effluent 102 before admission to the shift converter, which are not shown in FIG. 1.

The reforming process in block 100 is operated at a high pressure of at least 45 bar. Accordingly, the shifted gas 103 is at a similar pressure, apart from pressure losses through the shift converter and heat exchangers.

Figure 2:
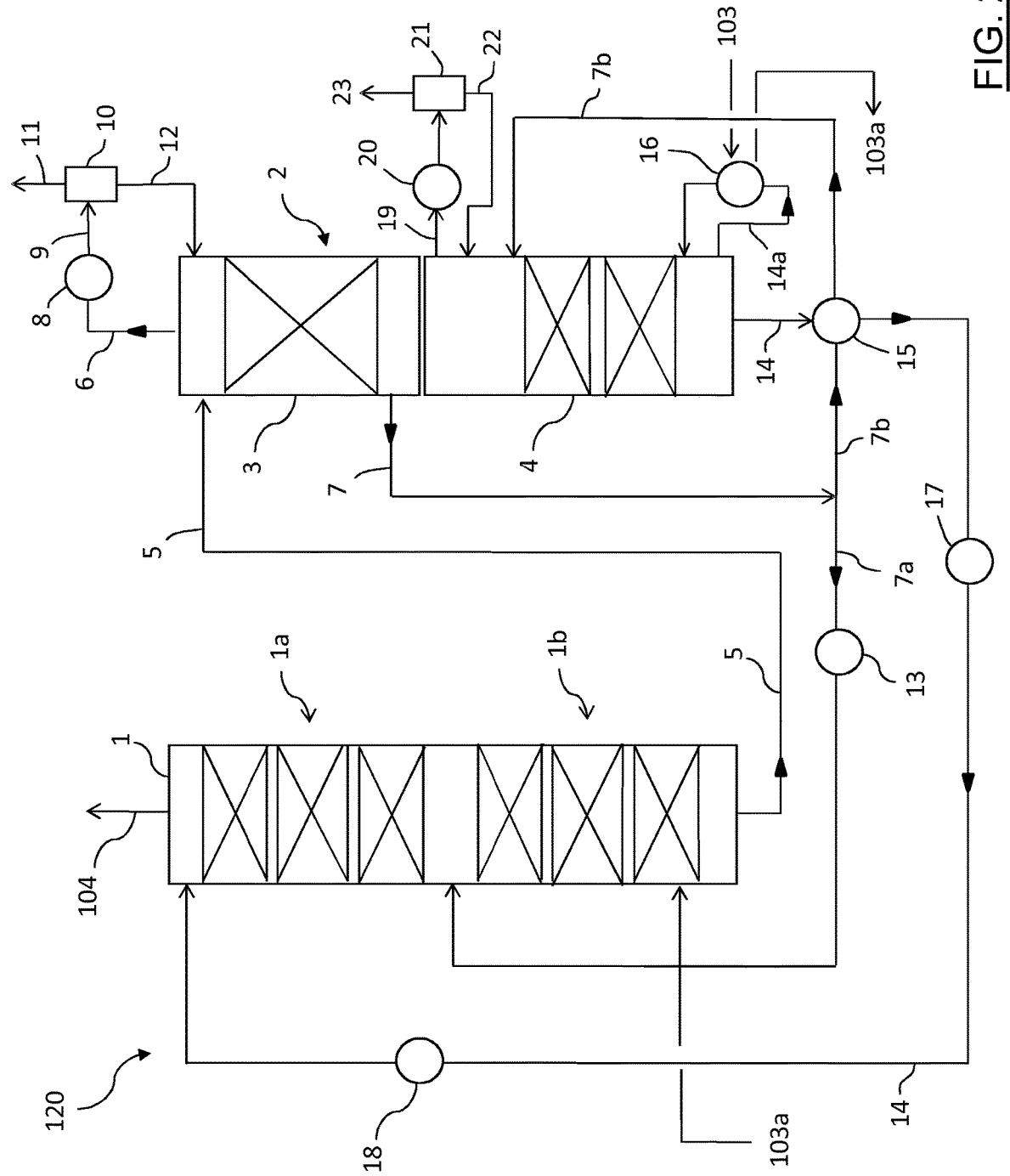
FIG. 2 is a scheme of a CO2 recovery section according to an embodiment of the invention.

FIG. 2 illustrates a scheme of the CO2 recovery section 120. Said section 120 comprises an absorbing section embodied with an absorber column 1 and a regeneration section embodied with a tower 2 comprising a depressurization zone 3 and a stripping zone 4. The depressurization zone 3 is located above the stripping zone 4.

The CO2 contained in gas 103 is absorbed in the absorber column 1 which produces a CO2-rich solution 5 (loaded solution). The tower 2 separates the CO2 contained in the loaded solution 5 and provides a stream of partially regenerated absorbing solution (semi-lean solution) 7 and a stream of fully regenerated solution (lean solution) 14. The separated CO2 is exported with a first CO2 stream 11 from the depressurization zone 3 and a second CO2 stream 23 from the stripping zone 4.

More in detail, the syngas 103 is supplied to the bottom of the absorber column 1 as stream 103a after a passage in a reboiler 16 of the tower 2. In a lower portion 1b of the column 1, the syngas 103a is contacted with a portion 7a of the semi-lean solution 7 coming from the regeneration tower 2 and, as a consequence, part of the carbon dioxide is absorbed. Then the partially purified syngas passes through the upper portion 1a of the column 1 contacting the lean solution 14 for further CO2 removal (polishing). The CO2-depleted syngas 104 is released from top of the column 1.

The absorption in the column 1 takes place at the high pressure of the gas 103a which, as stated above, is substantially the same pressure as reforming. The loaded solution 5 collected at the bottom of the column 1 is fed to the zone 3 of the tower 2 where it is depressurized to an intermediate pressure, preferably 5 to 10 bar.

Some of the CO2 contained in the loaded solution 5 is released during this step of depressurization, resulting in a gaseous stream 6 containing carbon dioxide, water vapour and small amounts of amine, and the semi-lean solution 7.

The carbon dioxide containing stream 6 is withdrawn from the upper portion of the depressurization zone 3 and passed through a reflux condenser 8 wherein water vapour and amine are condensed. The resulting two-phase stream 9 is passed to a phase separator 10 wherein it is separated into the above mentioned first CO2 gas 11 and into a condensate 12 which essentially comprises water and amine. Said condensate 12 returns to the depressurization zone 3.

A first portion 7a of the semi-lean solution 7 is recycled via pump 13 to the absorber column 1, namely to the lower portion 1b.

A second portion 7b of the semi-lean solution 7 is preheated by the lean solution 14 in a heat exchanger 15 and sent to the stripping zone 4.

The stripping zone is held at an elevated temperature by reboiler 16. A portion 14a of lean solution withdrawn from bottom of the tower 2 enters the reboiler 16, wherein it is partially or completely vaporized, and the vapours so obtained are returned to the stripping zone 4 to drive the stripping process. The heat source of said reboiler 16 is the gas 103. The gas 103 leaves the reboiler 16 as stream 103a and enters the column 1 as shown in FIG. 2. A further heat source (e.g. steam) can be provided if necessary.

A stream of carbon dioxide 19 saturated with water is withdrawn from the top of the stripping zone 4. Said stream 19 passes through a condenser 20 and a separator 21. The separated condensed water 22 is refluxed into the stripping zone 4 and the second CO2 gas 23 is obtained.

The lean solution 14 leaving the bottom of said stripping zone 4 is cooled by the heat exchanger 15 and is recycled to the upper portion 1a of the absorber column 1 via pump 17 and cooler 18.

The majority of the carbon dioxide contained in the loaded solution 5 is removed during the stripping of the semi-lean solution 7b. The stripping of the solution 7b is promoted by the heat recovered from gas 103 (through the reboiler 16) and can be termed heat stripping. Then, the process which releases the CO2 stream 19 is essentially a chemical process. For example about 80% of the total amount of CO2 originally contained in the solution 5 is represented by the chemically-removed CO2 stream 19.

Comparative Example

Figure 3:
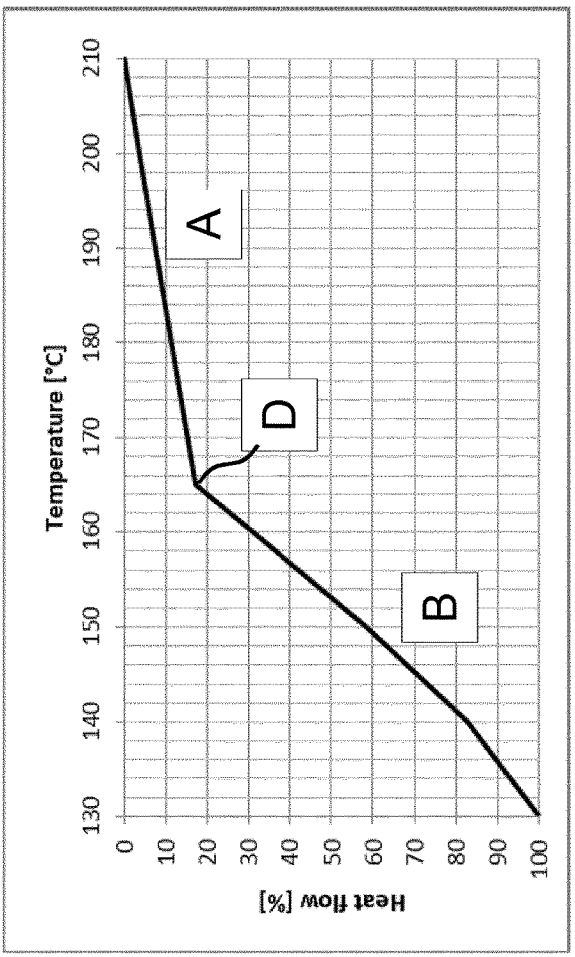
FIG. 3 is a diagram showing the cooling of a shift converter effluent at conventional reforming pressure of about 30 bar, which is typically used in the prior art as the heat source of the stripping of the semi-lean solution.
Figure 4:
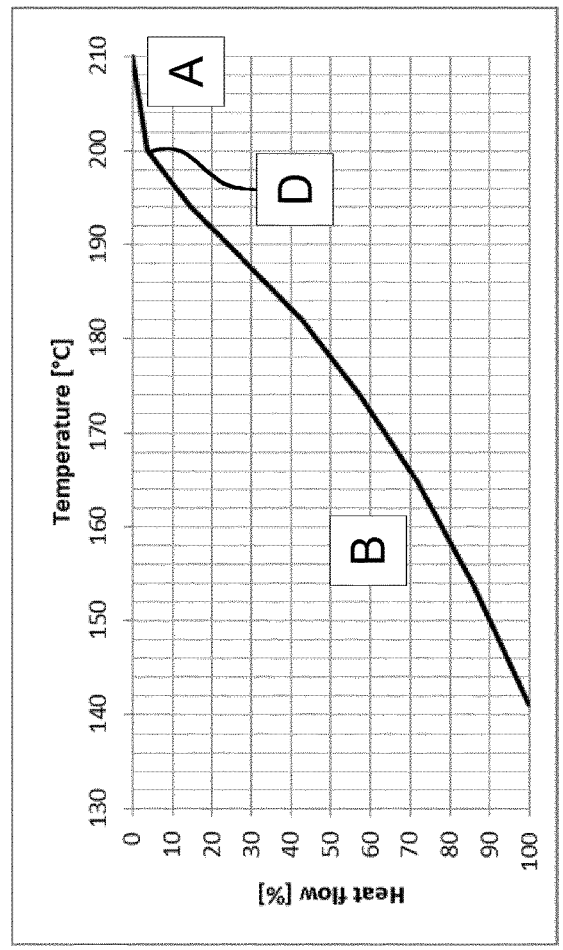
FIG. 4 is similar to FIG. 3, showing a diagram showing the cooling of a shift converter effluent at a higher pressure, which can be used according to the invention.

A comparison of FIGS. 3 and 4 shows the better efficiency of the invention in recovering the heat content of the shift converter effluent, for its use as the heat source of the stripping process of the semi-lean solution. The curves are for the same urea production capacity.

FIG. 3 shows the typical curve of cooling of said effluent, at a low pressure of about 1.7 bar. The horizontal axis denotes the temperature (° C.) and the vertical axis shows the % of heat flow (MW).

The curve shows a typical profile of heat flow when cooling the syngas from an inlet temperature of 210° C. to an outlet temperature of 130° C., which are the common conditions. FIG. 3 may represent for example the cooling of the gas 103 in the boiler 16.

The dew point D is about at 165° C. Above the dew point (portion A of the curve) cooling of the gas results in only a small amount of heat exchanged. For example cooling from 210 to 165° C. results in a transfer of less than 20% of the total heat flow which can be theoretically transferred from 200 to 130° C. The large majority of heat is transferred below the dew point (portion B of the curve) i.e. when cooling the syngas from 165 to 130° C.

The outlet temperature of the syngas is dictated by the temperature of the bottom liquid in the tower 2, which ultimately depends on the pressure since the bottom liquid is saturated. Hence the prior art does not allow to increase the pressure of stripping, since it would result in a higher outlet temperature of the syngas and, consequently, would reduce the heat input available to the stripping of the solution.

FIG. 4 shows an embodiment of the invention wherein, thanks to the higher reforming pressure, the dew point D of the shifted gas is about 200° C.

Accordingly, a larger amount of heat is available at high temperature, in particular more than 60% of the total heat flow is transferred above 170° C. Hence the stripping pressure (and then the pressure of delivery of the CO2) can be increased without affecting the ability to recover heat form the shifted gas.

What is claimed is:

1. A process for making a hydrogen-containing synthesis gas from a hydrocarbon feedstock, comprising the reforming of said hydrocarbon feedstock into a raw synthesis gas and purification of said raw synthesis gas,
    said purification comprising shift conversion of carbon monoxide into carbon dioxide and carbon dioxide removal,
    said removal of carbon dioxide from the synthesis gas including absorption of carbon dioxide into an absorbing medium, resulting in a stream of a CO2-loaded medium, and regeneration of said medium with recovery of CO2 absorbed therein,
    wherein:
    said raw synthesis gas is produced by said reforming step at a pressure of at least 45 bar,
    said regeneration of the CO2-loaded medium includes a step of chemical regeneration wherein the CO2-loaded medium receives a heat input from a heat source,
    the CO2-loaded medium, during said chemical regeneration process, has a temperature of at least 160° C.,
    wherein said heat source comprises at least one of the following:
        an effluent of a shift converter;
        a feed stream of a shift converter; and
        a cooling medium which circulates in an isothermal shift converter;
    wherein said heat source for regeneration of the CO2-loaded medium is a heat source stream having a dew point of at least 190° C.

2. The process according to claim 1, wherein the steam-to-carbon ratio in the reforming of said hydrocarbon feedstock is 2.9 or greater.

3. The process according to claim 2, wherein the steam-to-carbon ratio in the reforming of said hydrocarbon feedstock is 3.3 or greater.

4. The process according to claim 1, wherein the regeneration of CO2-loaded medium comprises:
    a first stage of flashing of the CO2-loaded medium from an input pressure to a predetermined flashing pressure, which results in a first amount of physically released carbon dioxide and a semi-lean medium;
    a second stage of heat stripping of at least a portion of said semi-lean medium, which includes transferring said heat input to the medium, and results in the production of a second amount of chemically released carbon dioxide and a lean medium, said stage of heat stripping being carried out at a stripping pressure;
    the second amount of carbon dioxide being at least 40% of the total amount of carbon dioxide.

5. The process according to claim 4, said stripping pressure of the semi-lean medium being at least 3 bar or higher.

6. The process according to claim 5, said stripping pressure being at least 5 bar or higher.

7. The process according to claim 6, said stripping pressure being in the range 5 to 10 bar.

8. The process according to claim 4, said second amount of carbon dioxide being greater than said first amount of carbon dioxide.

9. The process according to claim 4, wherein the flashing pressure, to which the CO2-rich medium is flashed and the semi-lean medium is obtained, is greater than or equal to said stripping pressure.

10. The process according to claim 1, wherein the absorbing medium is an aqueous solution.

11. The process according to claim 10, wherein the absorbing medium is an amine solution.

12. The process according to claim 1, said shift converter being a low-temperature shift converter or a medium-temperature shift converter.

13. The process according to claim 1, wherein the reforming of the hydrocarbon feedstock into said raw synthesis includes steam reforming and secondary reforming, or autothermal reforming.

14. The process according to claim 1, wherein the hydrogen-containing synthesis gas is suitable for synthesis of ammonia.

15. The process according to claim 1, wherein at least part of the recovered CO2 is compressed for sequestration or for a further use.

* * * * *